United States Patent
Khan et al.

(10) Patent No.: US 6,890,587 B2
(45) Date of Patent: May 10, 2005

(54) METHOD OF REPAIRING A CERAMIC COATING

(75) Inventors: Abdus S. Khan, Ennetbaden (CH); John Fernihough, Ennetbaden (CH); Maxim Konter, Klingnau (CH)

(73) Assignee: ALSTOM Technology LTD, Baden (CH)

( * ) Notice: Subject to any disclaimer, the term of this patent is extended or adjusted under 35 U.S.C. 154(b) by 244 days.

(21) Appl. No.: 10/120,417

(22) Filed: Apr. 12, 2002

(65) Prior Publication Data

US 2002/0164417 A1 Nov. 7, 2002

(30) Foreign Application Priority Data

Apr. 21, 2001 (EP) .............................. 01109811

(51) Int. Cl.⁷ .............................. B05D 3/12; B05D 7/14
(52) U.S. Cl. ....................... 427/142; 427/140; 427/230; 427/236; 427/239; 427/256; 427/282; 427/287; 427/372.2; 427/299; 427/327
(58) Field of Search .............................. 427/140, 142, 427/230, 236, 239, 256, 282, 287, 372.2, 299, 327

(56) References Cited

U.S. PATENT DOCUMENTS

| | | |
|---|---|---|
| 3,528,861 A | 9/1970 | Elam et al. |
| 4,055,705 A | 10/1977 | Stecura et al. |
| 4,152,223 A | 5/1979 | Wallace et al. |
| 4,248,940 A | 2/1981 | Goward et al. |
| 4,321,311 A | 3/1982 | Strangman |
| 4,585,481 A | 4/1986 | Gupta et al. |
| 4,676,994 A | 6/1987 | Demaray |
| 5,614,054 A | 3/1997 | Reeves et al. |
| 5,728,227 A | 3/1998 | Reverman |
| 5,759,301 A | 6/1998 | Konter et al. |
| 5,759,932 A | 6/1998 | Sangeeta et al. |
| 5,900,102 A * | 5/1999 | Reeves ........................ 156/344 |
| 5,972,424 A | 10/1999 | Draghi et al. |
| 5,985,368 A * | 11/1999 | Sangeeta et al. .......... 427/376.4 |
| 6,132,520 A | 10/2000 | Schilbe et al. |
| 6,146,692 A | 11/2000 | Sangeeta et al. |
| 6,158,957 A | 12/2000 | Marcin et al. |
| 6,274,193 B1 * | 8/2001 | Rigney et al. ............... 427/142 |
| 6,413,578 B1 * | 7/2002 | Stowell et al. ............... 427/142 |

FOREIGN PATENT DOCUMENTS

| | | | |
|---|---|---|---|
| EP | 0298309 A1 | 1/1989 | |
| EP | 0808913 A1 | 11/1997 | |
| EP | 0 808 913 A1 * | 11/1997 | ............. C23C/4/00 |
| EP | 0813930 A2 | 12/1997 | |
| GB | 705102 * | 3/1954 | |

* cited by examiner

Primary Examiner—Shrive P. Beck
Assistant Examiner—Jennifer Kolb Michener
(74) Attorney, Agent, or Firm—Adam J. Cermak

(57) ABSTRACT

It is a method of repairing a ceramic coating of an article after use of this article in a high temperature environment disclosed. The ceramic coating is removed locally at spalled areas, at the areas where the ceramic coating is removed locally a mixture including a powder of zirconia stabilized with one or a combination of yttria, calcia, scandia, magnesia, ceria and oxides of the rare earth group, and hydrated metallic halides as a binder is applied and the applied ceramic powder is dried.

10 Claims, No Drawings

METHOD OF REPAIRING A CERAMIC COATING

FIELD OF INVENTION

The invention relates to a process of repairing a ceramic coating of a component according to the preamble of claim 1.

STATE OF THE ART

Components designed for the use in the area of high temperature, e.g. blades or vanes of a gas turbine, are usually coated with environmentally resistant coatings. The coating protects the base material against corrosion and oxidation due to the thermal effect of the hot environment and consists of an alloy mostly using the elements Al and Cr. Most turbine components are coated for protection from oxidation and/or corrosion with, for example, a MCrAlY coating (base coat) and some are also coated with a thermal barrier coating (TBC) for thermal insulation. MCrAlY protective overlay coatings are widely known in the prior art. They are a family of high temperature coatings, wherein M is selected from one or a combination of iron, nickel and cobalt. As an example U.S. Pat. No. A-3,528,861 or U.S. Pat. No. A-4,585,481 disclose such kind of oxidation resistant coatings. U.S. Pat. No. A-4,152,223 as well discloses such method of coating and the coating itself.

Furthermore, in the state of the art Thermal-Barrier-Coatings (TBC) are known from different patents. U.S. Pat. No. A-4,055,705, U.S. Pat. No. A-4,248,940, U.S. Pat. No. A-4,321,311 or U.S. Pat. No. A-4,676,994 disclose a TBC-coating for the use in the turbine blades and vanes. The ceramics used are yttria stabilized zirconia and applied by plasma spray (U.S. Pat. No. A-4,055,705, U.S. Pat. No. A-4,248,940) or by electron beam process (U.S. Pat. No. A-4,321,311, U.S. Pat. No. A-4,676,994) on top of the MCrAlY bond coat.

The demands of operation of the parts in a gas turbine often lead to the degradation of the coating before the structural integrity of the underlying part itself is degraded. Hence, the base coat and TBC must be removed and re-applied. Such processes are known from EP-A2-813 930, EP-A1-298 309, U.S. Pat. No. 6,158,957, U.S. Pat. No. 6,132,520, U.S. Pat. No. 6,146,692, U.S. Pat. No. 5,728,227, U.S. Pat. No. 5,614,054 and U.S. Pat. No. 5,900,102. Many of these inventions such as U.S. Pat. No. 5,972,424, U.S. Pat. No. 6,158,957, U.S. Pat. No. 6,132,520 and U.S. Pat. No. 6,146,692 deal with the removal of TBC by caustic treatment in an autoclave at modest to elevated temperatures and pressures. A second method often used is the gaseous fluoride treatment such as gaseous hydrogen fluoride as disclosed in U.S. Pat. No. 5,728,227 or U.S. Pat. No. 5,614,054. Yet in another method, U.S. Pat. No. 5,900,102, the TBC was removed by treatment with a mixture of powders consisting of a halogen containing activator (i.e. ammonium fluoride, chloride etc), aluminum metal and inert alumina as a filler, again the reaction product is a gaseous fluoride, as in the above citations. It is to be noted that although the above inventions teach us only the methods of removing the damaged TBC from a component, none of them provide any new or noble method or a process for re-coat of the component from where TBC was removed— simply the TBC in the prior art was reapplied by the conventional plasma spray method.

However, in the prior art U.S. Pat. No. 5,759,932 and U.S. Pat. No. 5,985,368 disclose methods wherein the TBC is applied on the surface using a slurry. In essence the powdered yttria stabilized zirconia with/without porous zirconia spheres is blended in a paint mixer with a silicone resin, SR-350 and a lubricant, UVCON-50MB-2000.

It is also known that turbine blades and other components have only local areas of extremely high surface temperature during operation, whereas the rest of the component surface has a moderate temperature. This means that the environmentally protective coatings are degraded by far the most in these local areas of high temperature, which constitute about 5 to 20% of the total surface area of the whole component, and only moderately over the rest of the surface area.

SUMMARY OF THE INVENTION

It is object of the present invention to find a method of locally repairing thermal barrier coated components. This method should be especially suitable for the local repair of turbine blades and vanes of both aircraft and industrial gas turbine engines. Another objective is to prove a method of repairing a TBC on a site in the field.

According to the invention a method was found of repairing an article with a ceramic coating according to the preamble of the claim 1 wherein a. remnants of the ceramic coating adjacent to and inside of the areas of spallation are removed, b. the areas of spallation are prepared for local coating application by conventional means such as chemical treatment, grit blasting or abrasive cleaning, c. on the areas of spallation is applied a mixture including a powder of zirconia stabilized with one or a combination of yttria, calcia, scandia, magnesia, ceria and oxides of the rare earth group, and hydrated metallic halides as a binder, after which d. the applied mixture of ceramic powder and binder is dried.

With advantage the mixture of stabilized zirconia powder and hydrated metallic halides as a binder is prepared as a slurry with water alone or with water in combination with alcohol using hydrated aluminum chlorides before applying to the mentioned areas. The viscosity of the slurry can be adjusted by the addition of distilled water alone or by the addition of water in combination with alcohol to obtain a suitable flowability during spraying. In some cases the viscosity of the hydrated metallic hydride will be sufficient that no water or alcohol need be added to the slurry to achieve the desired properties. Hollow zirconia spheres could be added to the mixture of stabilized zirconia powder and hydrated metallic hydrides in order to offer the advantage of a higher effective porosity content of the TBC.

In one embodiment, the slurry coating is dried at a temperature between 20° C. and 100° C. and finally heat-treated at 55° to 750° C. to remove the evolving halogens, halogen gas, or residual water.

This method saves both time and investment costs because stripping and re-coating the entire surface area of the component using conventional means such as plasma spraying is unnecessary.

The hydrated metallic halide binder can consist of one or a combination of hydrated metallic halide components such as hydrated aluminum chloride and/or hydrated halides of magnesium, calcium, yttrium, zirconium, strontium, barium, including other hydrated halides of the rare earth group or group 11 alkaline halides.

In another embodiment of the invention, the sizes of individual powder particles of the stabilized zirconia powder range from 5 to 150 μm to offer the advantages of greater strength and lifetime on the component during service.

This invention is particularly useful when applied to articles such as blades, vanes or any other gas turbine component operating at high temperatures and coated with a TBC.

DETAILED DESCRIPTION OF INVENTION

The invention is related to a process of repairing an article with a TBC-coating being exposed to a high temperature environment or damaged due to the transport after the manufacture. The damage received by the component consists of spallation of the TBC localized to the areas of highest temperatures experienced during service or areas which were impacted due to Foreign Object Damage during service in the gas turbine. For the case of damage during shipping or other transport, the areas affected are localized to areas of impaction of the TBC on another hard object due to improper handling or packing. The article could possibly be a blade or a vane or any other part of a gas turbine engine such as a part of a burner chamber exposed to the hot gases of the gas turbine, the article being coated with a MCrAlY-coating to protect it against oxidation. On top of the MCrAlY there is a Thermal Barrier Coating known e.g. from different patents U.S. Pat. No. 4,055,705, U.S. Pat. No. 4,248,904, U.S. Pat. No. 4,321,311 or U.S. Pat. No. 4,676,994.

As base material often used is a superalloy e.g. Ni or Co based. A Ni based superalloy is disclosed in the patent U.S. Pat. No. 5,759,301.

It is well known to those skilled in the art that the types of localized damage described above have little or no effect on the lifetime of the TBC on the rest of the component. However, the TBC immediately surrounding the areas of spallation is often weakened and must be removed, and additionally there are often small residual amounts of TBC left on the area of spallation. Therefore according to the invention all the weakened TBC material adjacent to the area of spallation must be removed in order to insure a high quality repair, and any residual TBC within the general area of spallation must be removed to ensure proper bonding of the TBC repair material. The ceramic TBC coating could be removed locally by any conventional abrasive means such as grit blasting or grinding, and/or by a chemical stripping such as chemical etching using an acid and/or a mixture of acids. Any residual oxidized MCrAlY material from the bondcoat should also be removed by the above means to provide a high quality surface for the repair material to be applied.

At the areas where the ceramic coating is removed locally, a mixture including a powder of zirconia stabilized with one or a combination of yttria, calcia, scandia, magnesia, ceria and oxides of the rare earth group, and hydrated metallic halides as a binder is applied and the applied mixture is dried at moderate temperatures, whereby the constituents are tenaciously bound together. In one embodiment, the slurry coating is dried at a temperature of 20° to 100° C. and is then finally heat-treated at 55–750° C. to remove the evolving halogen compounds, halogen gases or residual water and/or alcohol.

The mixture of stabilized zirconia powder and hydrated metallic halides may offer the desired consistency, viscosity, bonding properties, and drying properties without any further addition. However, in some cases it is advantageous to make additions of distilled water and/or alcohol to the mixture in order to further control the viscosity of the slurry and obtain a suitable flowability during application.

The hydrated metallic halide binder can consist of one or a combination of hydrated metallic halide components such as hydrated aluminum chloride and/or hydrated halides of magnesium, calcium, yttrium, zirconium, strontium, barium, including other hydrated halides of the rare earth group or alkaline halides (group of the period system of the elements). The hydrated metallic hydrides are particularly advantageous to use as binders in this application. It is known to those skilled in the art that, e.g. hydrated aluminum chloride when exposed to elevated temperatures will decompose to hydrogen choride and water, which leave as gases, and alumina which bonds the yttria stabilized zirconia powder to itself and to the substrate and provides alpha alumina in the TBC known to provide oxidation resistance.

In an advantageous embodiment, the sizes of individual powder particles of the stabilized zirconia powder ranges from 5 to 150 $\mu$m to offer the advantages of greater strength and lifetime on the component during service.

The mixture of stabilized zirconia powder and hydrated metallic hydrides can be applied by painting, slurry spraying, or as a paste. Furthermore, in some cases it is advantageous to apply an initial layer of highly fluid slurry in order to maximize wetting of the local area to be repaired and provide good bonding of the next layer of repair material to the surface, and then apply a more viscous version of the slurry in order to ensure optimal structure during drying.

The method according to the present invention saves both time and investments costs because stripping and re-coating the entire TBC-coated portion of the component using conventional means such as plasma spraying is unnecessary. A further advantage is that the repair process is rapid, and if the appropriate equipment is used, can be carried out in the field with no need for detachment of the component from the engine assembly, nor any need for sending the component to a repair shop.

The invention is particularly advantageous when applied to a blade or a vane or any other gas turbine component consisting of a nickel or cobalt base alloy exposed to a high temperature environment and coated with TBC.

What is claimed is:

1. A method of repairing a ceramic coating of an article after damage due to the transport after manufacture or use of the article in a high temperature environment, the method comprising:

removing remnants of the ceramic coating adjacent to and inside of area of an area of spallation to form a repair area;

preparing the repair area for local coating application by a process selected from the group consisting of chemical treatment, abrasive cleaning, and combinations thereof;

applying a mixture on the repair area, the mixture including a powder of zirconia stabilized with a stabilizer selected from the group consisting of yttria, calcia, scandia, magnesia, ceria, oxides of the rare earth group, and combinations thereof, the mixture including hydrated metallic halides as a binder;

after applying said mixture, drying the applied mixture.

2. The method of claim 1, further comprising;

preparing said mixture as a slurry with water, optionally water in combination with alcohol, wherein said hydrated metallic halides comprises hydrated aluminum chlorides, before said applying.

3. The method of claim 2, wherein drying comprises drying the slurry at a temperature between 20° C. and 100° C. and finally heat-treated at a temperature between 55° C. and 750°C.

4. The method of claim 2, wherein preparing said mixture further comprises including hollow zirconia a spheres in said mixture.

5. The method of claim 1, wherein said hydrated metallic halide binder a component selected from the group consisting of hydrated aluminum chloride, hydrated halides of magnesium, calcium, yttrium, zirconium, strontium, or barium, hydrated halides of the rare earth group, group 11 alkaline halides, and combinations thereof.

6. The method of claim 1, wherein the sizes of individual powder particles of the stabilized zirconia powder ranges from 5 to 150 m.

7. The method of claim 1, wherein applying comprises applying said mixture by a process selected from the group consisting of painting, slurry spraying, and as a paste.

8. The method of claim 1, wherein the article comprises a part of a gas turbine engine including a nickel or cobalt base alloy exposed to a high temperature environment coated with TBC.

9. The method of claim 8, wherein said part of a gas turbine engine is selected from the group consisting of a turbine blade and a turbine vane.

10. The method of claim 1, wherein abrasive cleaning comprises a process selected from the group consisting of grit blasting and grinding.

* * * * *